United States Patent
Su

(10) Patent No.: US 8,070,176 B1
(45) Date of Patent: Dec. 6, 2011

(54) SAFETY CLIP FOR WEIGHT DISTRIBUTION TRAILER HITCH

(76) Inventor: Austin Su, Wilmington, CA (US)

(*) Notice: Subject to any disclaimer, the term of this patent is extended or adjusted under 35 U.S.C. 154(b) by 0 days.

(21) Appl. No.: 12/841,872

(22) Filed: Jul. 22, 2010

(51) Int. Cl.
*B60D 1/34* (2006.01)
*B62D 53/00* (2006.01)

(52) U.S. Cl. .............. 280/406.1; 280/405.1; 280/406.2

(58) Field of Classification Search .......... 280/400, 280/405.1, 406.1, 406.2, 407, 432, 455.1, 280/456.1, 457, 460.1, 479.3, 480, 490.1, 280/493, 494, 497, 498, 504, 507
See application file for complete search history.

(56) References Cited

U.S. PATENT DOCUMENTS

| | | | | |
|---|---|---|---|---|
| 2,817,541 A * | 12/1957 | Mathisen | ........... | 280/406.2 |
| 3,151,879 A * | 10/1964 | Bock | ........... | 280/406.2 |
| 3,185,499 A * | 5/1965 | Reese | ........... | 280/406.2 |
| 3,370,867 A * | 2/1968 | Berlincourt et al. | ....... | 280/406.2 |
| 3,490,788 A * | 1/1970 | Mann | ........... | 280/406.1 |
| 3,520,556 A * | 7/1970 | Warner | ........... | 280/406.2 |
| 3,567,251 A * | 3/1971 | Dalton | ........... | 280/406.2 |
| 3,679,231 A * | 7/1972 | Derr, Jr. | ........... | 280/406.2 |
| 4,049,288 A * | 9/1977 | Young | ........... | 280/406.2 |
| 4,211,427 A * | 7/1980 | Young et al. | ........... | 280/406.2 |
| 5,465,991 A * | 11/1995 | Kass et al. | ........... | 280/457 |
| 5,788,257 A | 8/1998 | Meyerhofer | | |
| 5,868,414 A | 2/1999 | McCoy | | |
| 5,890,726 A * | 4/1999 | McCoy et al. | ........... | 280/406.1 |
| 5,984,341 A | 11/1999 | Kass | | |
| 6,629,701 B1 | 10/2003 | Colibert | | |
| 6,722,682 B2 | 4/2004 | Valliere | | |

* cited by examiner

*Primary Examiner* — Tony H. Winner
*Assistant Examiner* — Marc Scharich
(74) *Attorney, Agent, or Firm* — Gary M. Anderson; Fulwider Patton LLP

(57) ABSTRACT

A trailer hitch is disclosed having a spacer in the form of a fastener or stopper that limits the travel of a spring clip so as to allow complete removal of the safety pin from the associated weight distribution rod, but does not allow the clip to extend to a position where the pin's end passes the entrance of the hitch's outer surface. The fastener/stopper thus prevents the user or vibration/wear from allowing the clip to overextend to the point where the pin may become separated from the hitch.

7 Claims, 2 Drawing Sheets

SAFETY CLIP FOR WEIGHT DISTRIBUTION TRAILER HITCH

BACKGROUND

The present invention is directed to weight distribution trailer hitches, and more particularly to a weight distribution trailer hitch with a novel safety clip that prevents dislodgement of the safety pin.

Weight distribution trailer hitches are well known in the art. The purpose of a weight distribution hitch is to prevent the weight of the trailer from causing the juncture of the tow vehicle and the trailer to drop, which can lead to the front of the tow vehicle raising up. This is an unsafe condition that can place undue stress on various elements of the trailer and the tow vehicle. The weight distribution hitch removes excess weight from the tow vehicle's rear axle and distributes the excess weight to the front wheels of the tow vehicle and the trailer wheels.

Reference to weight distribution trailer hitches can be found, for example, in U.S. Pat. No. 6,722,682 to Valliere et al., U.S. Pat. No. 5,868,414 to McCoy et al., and U.S. Pat. No. 5,984,341 to Kass et al., the contents of each of which are fully incorporated herein by reference.

Weight distribution hitches normally utilize a shank formed of a tubular shaft that is secured to the tow vehicle with a hitch pin. A shank bar is a rectangular member with spaced holes that mounts vertically to the shank and is used to set the height of the hitch. The hitch includes a U-shaped section that receives the shank bar, and includes bolt holes that align with holes on the shank bar so that the hitch may be bolted to the shank with an adjustable height to accommodate different size trailers and tow vehicles. The hitch includes a pair of weight distribution rods that have upturned proximal ends. The distal ends of the weight distribution rods are configured to secure a lift chain that connects the weight distribution rods to the trailer. The upturned proximal ends of the distribution rods are releasably received from below in two tubular cavities in the hitch. To prevent the distribution rods from falling out of the hitch's tubular cavities, a pin is used that passes through the wall of the tubular cavity and into an aperture in the distribution rods. The lift chains serve to establish a maximum distance that the weight distribution rods extend below the trailer, which in turn prevents the hitch from dropping much below its unhitched elevation. This system causes much more balanced towing and helps to prevent tipping or loss of control of the trailer.

It has been discovered that the pin used to maintain the weight distribution rods in the tubular cavities of the hitch can become inadvertently dislodged when subject to the routine vibrations of towing conditions, particularly on uneven roads and at higher speeds. Loss of the pin can result in separation of the trailer from the towing vehicle, loss of control of the trailer, or damage to the hitch. Therefore, it is also known in the art to provide a spring clip between the head of the pin and the outer surface of the tubular cavity on the hitch. The spring clip is riveted or otherwise mounted at a lower surface to the outer surface of the hitch's tubular cavity, and the spring clip includes a vertical slot that receives the shank of the pin. The spring clip's upper portion is biased to bear against (or generally against) the outer surface of the cylindrical cavity, while the bottom portion is mounted directly to the same surface. When it is desired to remove the weight distribution rods, the clip can be pulled back manually against its bias away from the surface of the hitch's tubular cylinder, allowing the pin to be removed from the proximal upturned end of the weight distribution rods. With the pin removed, the rods can be easily removed from the hitch and the hitch can then be disassembled, adjusted, or removed from the tow vehicle/trailer. When it is desired to reassemble the system, the clip is pulled away from the surface of the hitch so that the pin is extracted from the cavity. With the pin displaced, the weight distribution rods can be inserted into the cavity and the spring clip released to position the pin back in its designated position to once again retain the weight distribution rods in the hitch.

The present inventor has discovered that the above described system still has a shortcoming, namely the propensity for the pin to become separated or lost. The pin may become lost due to the clip's loss of resiliency after many repeated openings, to the point where the clip no longer bears against the surface of the hitch and gradually becomes more and more separated from this surface, until eventually the vibration of the towing operation can cause the pin to become dislodged. The pin can also become dislodged while the weight distribution rods are being inserted or removed from the hitch. That is, if the user does not open the spring clip far enough, the pin will not clear the cavity and the rods cannot be removed/inserted. However, if the clip is opened too far, the pin may become dislodged and fall into the dirt, roll away, or become lost. With repeated use, the spring clip can begin to lose its capacity to snap back into position and lose its spring action, leading to overextension of the clip. When trying to insert or remove the weight distribution rods, the loss of the pin can be particularly disconcerting and can present a dangerous situation. The present invention addresses these shortcoming and provides an economic solution to prevent dislodgement of the pin from the hitch.

SUMMARY OF THE INVENTION

The present invention is a spacer in the form of a fastener or stopper that limits the travel of the spring clip on a trailer hitch so as to allow complete removal of the safety pin from the associated weight distribution rod, but does not allow the clip to extend to a position where the pin's end passes the entrance of the hitch's outer surface. The fastener/stopper thus allows the system described above to be used exactly as before, but prevents the user or vibration/wear from allowing the clip to overextend to the point where the pin may become separated from the hitch.

These, and other advantages of the present invention, will become apparent from the figures and the detailed description of the invention set forth below.

DETAILED DESCRIPTION OF THE PREFERRED EMBODIMENTS

Figure 1:
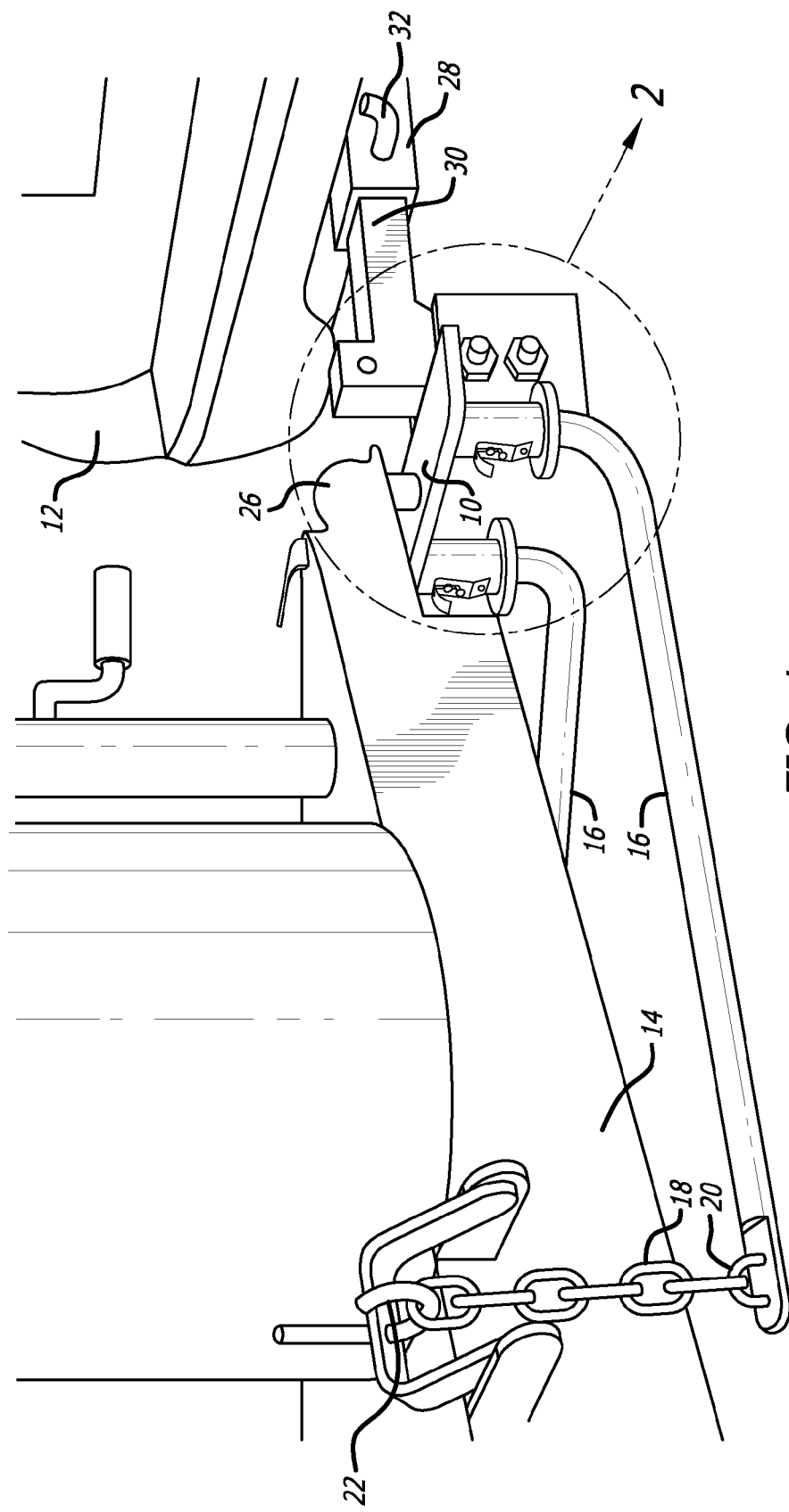
FIG. 1 is an elevated, perspective view of a weight distribution hitch.

FIG. 1 illustrates a trailer hitch illustrating one embodiment of the present invention. It is to be understood that while a particular embodiment is illustrated and described, the scope of the invention is not limited to the particular embodiment(s) shown in the drawings or described herein. Rather, the descriptions and depictions are intended to teach the concepts of the present invention without imposing any limitation as to shape, size, dimension, method, or any other specific feature shown or described. Further, the mechanics of hitching the trailer to the tow vehicle using a weight distribution hitch is well known in the art, and the full description of the techniques, methods, and structure are omitted herein for brevity except to help define the environment of the present invention. Further details of the hitching process can be found in the Valliere, McCoy, and Kass patents previously referenced and incorporated herein by reference.

Returning to FIG. 1, hitch 10 is shown coupling a tow vehicle 12 to a trailer 14 as is known in the art. The hitch uses a pair of horizontal weight distribution rods 16 that connect at a distal end to lift chains 18 via a half ring mount 20, where the lift chains 18 are hooked onto the trailer 14 at hook 22. Hitch 10 includes a ball mount 24 that is captured by the trailer's ball mount shroud 26 to position the trailer on the hitch 10. The tow vehicle 12 has a hitch socket 28 sized to receive a hitch shank 30, which locks into the hitch socket 28 by virtue of the lock pin 32.

Figure 2:
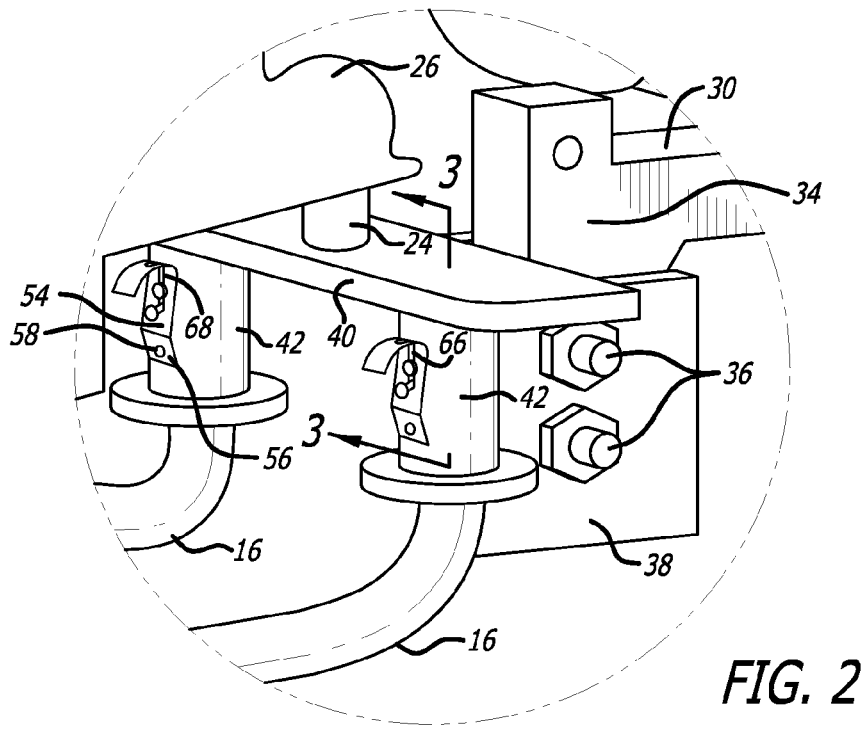
FIG. 2 is an enlarged, sectional view of the connection of the weight distribution rods to the hitch.

With reference to FIG. 2, the hitch shank 30 includes an integral, downwardly projecting shank bar 34 with vertically spaced holes (not shown) that receive mounting bolts 36. The shank bar 34 is slidingly received within a U-shaped mounting unit 38 that is formed as part of the hitch 10. The mounting unit has bolt holes that align with the bolt holes of the shank bar 34 so that bolts 36 can pass through the mounting unit 38 and form a solid connection for the hitch 10 to mount to the tow vehicle 12. The mounting unit 38 can take outer forms, such as clamps, cylindrical enclosures, etc., and the particular mounting type for the hitch plays no particular role in the present invention.

The mounting unit 38 is connected to a face plate 40 that supports the ball mount 24 thereon, and includes first and second hollow cylindrical pipes 42 that are sized to receive the weight distribution rods therein. The weight distribution rods 16 have an upturned proximal end that are received in the open end of the hollow cylindrical pipe 42. To maintain the upturned end 44 of the weight distribution rod 16 inside the cavity 46 defined by the hollow cylindrical pipe, the weight distribution rod 16 includes a hole 50 that receives a safety pin 52 passing through an aperture 84 in the hollow cylindrical pipe 42. With the safety pin 52 engaged with the hole 50 of the weight distribution rod 16 (see FIG. 3), the weight distribution rod 16 is captured inside the cylindrical pipe 42 and the system is secured.

Figure 3:
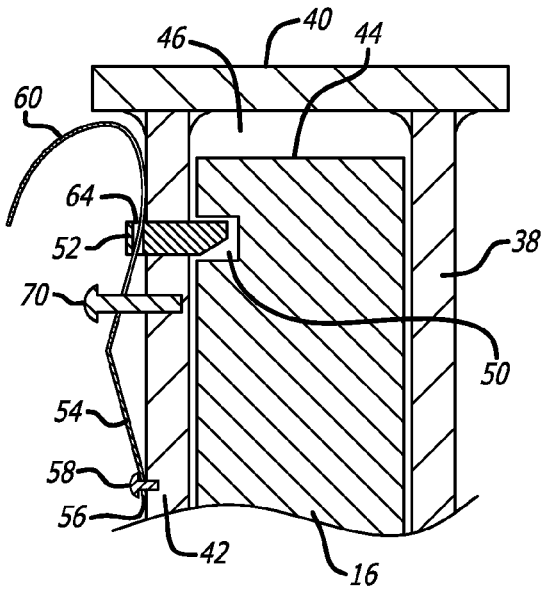
FIG. 3 is a side view in cross section of the weight distribution rods in the hitch with the pin located in the rod.

The safety pin 52 is carried by a spring clip 54 that is affixed at a first end 56 by a fastener 58 such as a rivet, and the second end is formed into a U-shaped configuration to form a pull tab 60 that can be grasped or actuated by a finger to pull the spring clip 54 away from the hollow cylindrical pipe 42. As is known in the art, the spring clip 54 is biased with the help of the fastener 58 to bear against the outer surface 62 of the hollow cylindrical member 42. The safety pin 52 has an annular groove 64 that engages inner edges 66 of a vertical slot 68 extending longitudinally down the middle of the spring clip 54, so that when the spring clip 54 is pulled away from the hollow cylindrical pipe 42, the safety pin 52 is pulled out of the hole 50 of the weight distribution rod 16 and the rod can then be removed from the hitch 10 (see FIG. 4). When the pull tab 60 is released, the spring clip 54 returns to its biased state as shown in FIG. 3. Thus, a position of the safety pin 52 can be controlled by pulling the spring clip 54 at the pull tab 60 and then releasing the pull tab 60 to position the safety pin 52 back in the weight distribution rod 16.

Figure 4:
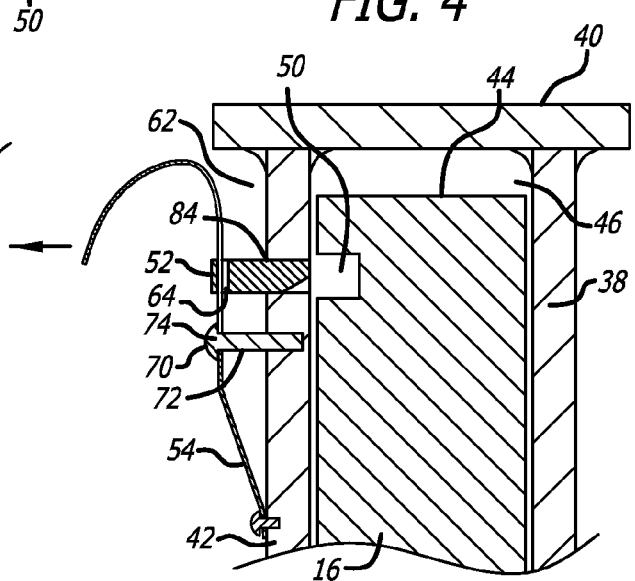
FIG. 4 is the view of FIG. 3 with the clip extended to the stopper to permit removal of the pin from the rod without removal of the pin from the hitch.

To prevent the spring clip 54 from being over-extended, thereby releasing the safety pin 52 from the hollow cylindrical pipe 42, a stopper 70 is placed between the fastener 58 and the safety pin 52. The stopper 70 is threaded or otherwise fixed in the hollow cylindrical pipe 42 and includes a shaft 72 and a head 74. The head 74 has a width that is greater than a width of the slot 68, as shown in FIG. 2, so that the spring clip 54 cannot extend past the head 74 of the stopper 70. With the first end of the shaft 72 of the stopper 70 mounted in the cylindrical pipe 42, a length of the shaft 72 defines a range of motion of the spring clip 54 toward and away from the hollow cylindrical pipe 42. The opposite ends of the range of motion of the spring clip 54 is shown in FIGS. 3 and 4, respectively. In FIG. 3, the spring clip 54 bears against the outer surface 62 of the cylindrical pipe 42, and in FIG. 4 the spring clip 54 bears against the head 74 of the stopper 70. The motion of the spring clip 54 must fall between these two positions at all times.

From FIG. 4, it can be seen that the safety pin 52 can be removed from the weight distribution rod 16 by pulling the pull tab 60 of the spring clip 54 to its maximum position away from the hollow cylindrical pipe 42, but the safety pin's tip never exits the aperture 84 of the hollow cylindrical pipe 42. Therefore, the presence of the stopper 70 and more particularly the position of the stopper head 74 establishes a range of motion that prevents the safety pin 52 from ever becoming dislodged either by manual over-extension of the pull tab 60 or via excessive vibration or deformation of the spring clip 54 due to wear. The length of the shaft 72 of the stopper 70 is therefore selected to permit the spring clip 54 to distend from the hollow cylindrical pipe 42 far enough to allow the safety pin 52 to be removed from the weight distribution rod 16, but not far enough to allow the safety pin 52 to withdraw beyond the outer surface of the hollow cylindrical pipe 42.

The present invention addresses the problem of safety pin dislodgement without impeding or hindering the function and operation of the spring clip/safety pin assembly. Although specific embodiments have been described, the scope of the present invention is properly defined by the appended claims without limitation to any specific embodiment or drawing used to illustrate the invention.

I claim:

1. A trailer hitch, comprising:
   a mounting unit for coupling the trailer hitch to a vehicle;
   a first hollow cylindrical member defining a cavity for receiving a weight distribution rod therein, the first hollow cylindrical member including a pin hole extending from the cavity to an outer surface of the first hollow cylindrical member;
   a spring clip affixed to the outer surface of the first hollow cylindrical member, the spring clip including a slot defining first and second inner edges;
   a safety pin having a first end with grooves that receive the first and second inner edges of the spring clip therein to retain the safety pin within the slot, and a second end sized to be inserted through the pin hole of the first hollow cylindrical member to engage the weight distribution rod when said weight distribution rod is disposed in said cavity; and
   a stopper rigidly extending radially outwardly from the outer surface of the first hollow cylindrical member, having a shaft with a first end secured to the outer surface of the first hollow cylindrical member, the shaft passing through an opening in the spring clip thereby allowing the spring clip to move along a length of the shaft, and a second end with a head having a width greater than a width of the opening of the spring clip, a position of the head defining a maximum distance that the spring clip can distend from the first hollow cylindrical member;

wherein a length of said shaft of the stopper is selected to permit the second end of the safety pin to withdraw from within the first hollow cylindrical member to, but not beyond, the outer surface of the first hollow cylindrical member.

2. The trailer hitch of claim 1, wherein the mounting unit is a U-shaped mount configured for receiving a rectangular shank bar.

3. The trailer hitch of claim 1, further comprising a second hollow cylindrical member including a pin hole extending from a cavity defined thereby.

4. The trailer hitch of claim 1, wherein the slot in the spring clip is a vertical slot extending along a longitudinal direction of the spring clip.

5. The trailer hitch of claim 1, wherein the opening of the spring clip is the slot.

6. The trailer hitch of claim 1, wherein the spring clip is affixed to the first hollow cylindrical member by a rivet.

7. The trailer hitch of claim 1, wherein the spring clip includes a generally U-shaped end defining a pull tab for gripping the spring clip.

* * * * *